(12) United States Patent
Maes

(10) Patent No.: US 9,495,521 B2
(45) Date of Patent: *Nov. 15, 2016

(54) SYSTEM SELF INTEGRITY AND HEALTH VALIDATION FOR POLICY ENFORCEMENT

(75) Inventor: Stephane H. Maes, Fremont, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 380 days.

This patent is subject to a terminal disclaimer.

(21) Appl. No.: 13/022,367

(22) Filed: Feb. 7, 2011

(65) Prior Publication Data

US 2011/0197260 A1    Aug. 11, 2011

Related U.S. Application Data

(60) Provisional application No. 61/301,751, filed on Feb. 5, 2010.

(51) Int. Cl.
*G06F 21/00* (2013.01)
*G06F 21/10* (2013.01)
*G06F 21/55* (2013.01)

(52) U.S. Cl.
CPC ............. *G06F 21/10* (2013.01); *G06F 21/554* (2013.01)

(58) Field of Classification Search
None
See application file for complete search history.

(56) References Cited

U.S. PATENT DOCUMENTS

| 6,035,025 | A | 3/2000 | Hanson |
| 6,044,403 | A | 3/2000 | Gerszberg et al. |
| 6,105,137 | A * | 8/2000 | Graunke et al. ............... 726/24 |
| 6,463,470 | B1 | 10/2002 | Mohaban et al. |
| 6,493,437 | B1 | 12/2002 | Olshansky |
| 6,603,844 | B1 | 8/2003 | Chavez et al. |
| 6,842,628 | B1 | 1/2005 | Arnold et al. |
| 7,043,553 | B2 * | 5/2006 | Monsen et al. ............... 709/229 |
| 7,137,003 | B2 | 11/2006 | Krishnan et al. |
| 7,185,364 | B2 | 2/2007 | Knouse et al. |
| 7,194,503 | B2 | 3/2007 | Shell et al. |
| 7,293,177 | B2 | 11/2007 | Lahti et al. |
| 7,403,763 | B2 | 7/2008 | Maes |
| 7,487,493 | B1 * | 2/2009 | Faulkner ........................ 717/105 |
| 7,562,216 | B2 | 7/2009 | Borthakur et al. |
| 7,657,746 | B2 | 2/2010 | Paramasivam et al. |
| 7,676,550 | B1 | 3/2010 | Jachner |
| 7,809,898 | B1 | 10/2010 | Kiselev et al. |

(Continued)

OTHER PUBLICATIONS

U.S. Appl. No. 12/166,535, filed Jul. 2, 2008, Advisory Action dated Apr. 9, 2012, 3 pages.

(Continued)

*Primary Examiner* — Jeffery Williams
(74) *Attorney, Agent, or Firm* — Kilpatrick Townsend & Stockton LLP

(57) ABSTRACT

Embodiments of the invention provide methods and systems for enforcing system self integrity validation policies. The method includes accessing, by a policy enforcer, a plurality of policies configured to enforce system integrity, monitoring system performance to determine actions executed by the system, and based on at least one of the plurality of policies, comparing the system performance with system performance required by the at least one or the plurality of policies. The method further includes, based on the comparison, determining that the system has performed in a manner contrary to the requirements of the at least one policy, and in response, prohibiting access of the system to services provided by a service provider.

18 Claims, 6 Drawing Sheets

(56) References Cited

U.S. PATENT DOCUMENTS

| | | | |
|---|---|---|---|
| 7,869,788 B2 | 1/2011 | Maes | |
| 7,881,732 B2 | 2/2011 | Newville | |
| 8,065,712 B1 | 11/2011 | Cheng et al. | |
| 8,099,325 B2 | 1/2012 | Gangadharpalli et al. | |
| 8,112,483 B1 | 2/2012 | Emigh et al. | |
| 8,117,438 B1 | 2/2012 | Albisu et al. | |
| 8,234,167 B2 | 7/2012 | Civanlar et al. | |
| 8,335,720 B2 | 12/2012 | Juang et al. | |
| 8,387,108 B1 | 2/2013 | Satish et al. | |
| 8,479,265 B2 | 7/2013 | Maes | |
| 2002/0176579 A1 | 11/2002 | Deshpande et al. | |
| 2002/0178381 A1 | 11/2002 | Lee et al. | |
| 2003/0027549 A1 | 2/2003 | Kiel et al. | |
| 2003/0135746 A1* | 7/2003 | Abbott et al. | 713/193 |
| 2003/0158914 A1 | 8/2003 | Satomi et al. | |
| 2003/0208754 A1 | 11/2003 | Sridhar et al. | |
| 2003/0233322 A1 | 12/2003 | Uchida et al. | |
| 2004/0002878 A1 | 1/2004 | Maria Hinton | |
| 2004/0044623 A1 | 3/2004 | Wake et al. | |
| 2004/0054923 A1* | 3/2004 | Seago et al. | 713/201 |
| 2004/0059939 A1 | 3/2004 | de Jong | |
| 2004/0098715 A1 | 5/2004 | Aghera et al. | |
| 2004/0133909 A1 | 7/2004 | Ma | |
| 2004/0198374 A1 | 10/2004 | Bajikar | |
| 2004/0209595 A1 | 10/2004 | Bekanich | |
| 2004/0209614 A1 | 10/2004 | Bright et al. | |
| 2004/0260778 A1 | 12/2004 | Banister et al. | |
| 2005/0014485 A1 | 1/2005 | Kokkonen et al. | |
| 2005/0053241 A1 | 3/2005 | Fan et al. | |
| 2005/0068167 A1 | 3/2005 | Boyer et al. | |
| 2005/0091346 A1 | 4/2005 | Krishnaswami et al. | |
| 2005/0108688 A1 | 5/2005 | Lucovsky et al. | |
| 2005/0135240 A1 | 6/2005 | Ozugur | |
| 2005/0138430 A1 | 6/2005 | Landsman | |
| 2005/0154933 A1 | 7/2005 | Hsu et al. | |
| 2005/0187940 A1 | 8/2005 | Lora et al. | |
| 2005/0210499 A1 | 9/2005 | Shima | |
| 2006/0040642 A1 | 2/2006 | Boris et al. | |
| 2006/0184640 A1 | 8/2006 | Hatch | |
| 2006/0212545 A1 | 9/2006 | Nichols et al. | |
| 2006/0217107 A1 | 9/2006 | Maes | |
| 2006/0242688 A1 | 10/2006 | Paramasivam et al. | |
| 2006/0288099 A1 | 12/2006 | Jefferson et al. | |
| 2007/0024453 A1 | 2/2007 | Mohammed et al. | |
| 2007/0067297 A1 | 3/2007 | Kublickis | |
| 2007/0143827 A1* | 6/2007 | Nicodemus et al. | 726/2 |
| 2007/0143829 A1 | 6/2007 | Hinton et al. | |
| 2007/0162343 A1 | 7/2007 | Landesmann | |
| 2007/0168510 A1 | 7/2007 | Ladd et al. | |
| 2007/0191023 A1 | 8/2007 | Walter | |
| 2007/0204017 A1 | 8/2007 | Maes | |
| 2007/0244750 A1 | 10/2007 | Grannan et al. | |
| 2007/0245414 A1 | 10/2007 | Chan et al. | |
| 2008/0010301 A1 | 1/2008 | Tian et al. | |
| 2008/0086531 A1 | 4/2008 | Chavda et al. | |
| 2008/0126779 A1* | 5/2008 | Smith | 713/2 |
| 2008/0134259 A1 | 6/2008 | He | |
| 2008/0201179 A1 | 8/2008 | Maes | |
| 2008/0201188 A1 | 8/2008 | Heyman et al. | |
| 2008/0205628 A1 | 8/2008 | Mandalia et al. | |
| 2008/0221985 A1 | 9/2008 | Civanlar et al. | |
| 2008/0301189 A1 | 12/2008 | Petit et al. | |
| 2009/0037594 A1 | 2/2009 | Sever et al. | |
| 2009/0047972 A1 | 2/2009 | Neeraj | |
| 2009/0049309 A1* | 2/2009 | Brinker et al. | 713/189 |
| 2009/0187919 A1 | 7/2009 | Maes | |
| 2009/0193117 A1 | 7/2009 | Oh | |
| 2009/0255000 A1 | 10/2009 | Winterbottom et al. | |
| 2009/0292595 A1 | 11/2009 | Tonnison et al. | |
| 2009/0300704 A1 | 12/2009 | Boberg et al. | |
| 2010/0005511 A1 | 1/2010 | Maes | |
| 2010/0043077 A1 | 2/2010 | Robert | |
| 2010/0064341 A1* | 3/2010 | Aldera | 726/1 |
| 2010/0075673 A1 | 3/2010 | Colbert et al. | |
| 2010/0077484 A1 | 3/2010 | Paretti et al. | |
| 2010/0088371 A1 | 4/2010 | Xu et al. | |
| 2010/0099387 A1 | 4/2010 | So et al. | |
| 2010/0154036 A1 | 6/2010 | McColgan et al. | |
| 2010/0162126 A1 | 6/2010 | Donaldson et al. | |
| 2010/0162149 A1 | 6/2010 | Sheleheda et al. | |
| 2010/0257358 A1 | 10/2010 | Grajek et al. | |
| 2010/0268767 A1 | 10/2010 | McColgan et al. | |
| 2010/0312621 A1 | 12/2010 | Abdulhayoglu | |
| 2010/0325427 A1* | 12/2010 | Ekberg et al. | 713/156 |
| 2011/0010543 A1* | 1/2011 | Schmidt et al. | 713/168 |
| 2011/0038483 A1 | 2/2011 | Goeller et al. | |
| 2011/0166943 A1 | 7/2011 | Maes | |
| 2011/0167153 A1 | 7/2011 | Maes | |
| 2011/0167479 A1 | 7/2011 | Maes | |
| 2011/0173251 A1 | 7/2011 | Sandhu et al. | |
| 2011/0182283 A1 | 7/2011 | Van Buren et al. | |
| 2011/0196728 A1 | 8/2011 | Maes | |
| 2011/0197257 A1 | 8/2011 | Maes | |
| 2012/0030771 A1 | 2/2012 | Pierson et al. | |
| 2012/0102334 A1 | 4/2012 | O'Loughlin et al. | |
| 2012/0117255 A1 | 5/2012 | Oh et al. | |
| 2012/0278869 A1* | 11/2012 | Guccione et al. | 726/5 |
| 2012/0284100 A1 | 11/2012 | Goldberg | |
| 2012/0320888 A1 | 12/2012 | Annamalai et al. | |
| 2013/0304913 A1 | 11/2013 | Boyer et al. | |

OTHER PUBLICATIONS

U.S. Appl. No. 12/986,432, filed Jan. 7, 2011, Office Action dated Apr. 11, 2012, 15 pages.

U.S. Appl. No. 12/986,432, filed Jan. 7, 2011, Final Office Action dated Jul. 31, 2012, 18 pages.

U.S. Appl. No. 12/166,535, filed Jul. 2, 2008, Office Action dated Jun. 23, 2011, 5 pages.

U.S. Appl. No. 12/166,535, filed Jul. 2, 2008, Office Action dated Sep. 14, 2011,15 pages.

Gasmelseid, T. M., "From Operational Dashboards to E-Business:Multiagent Formulation of Electronic Contracts", International Journal E-Business vol. 3, Issue 3, 2007, 21 pages.

U.S. Appl. No. 12/986,435, filed Jan. 7, 2011, Advisory Action dated May 29, 2013, 3 pages.

U.S. Appl. No. 12/986,577, filed Jan. 7, 2011, Final Office Action dated May 7, 2013, 17 pages.

U.S. Appl. No. 12/166,535, filed Jul. 2, 2008, Notice of Allowance dated Mar. 5, 2013, 21 pages.

U.S. Appl. No. 12/986,435, filed Jan. 7, 2011, Non Final Office Action dated Feb. 5, 2013, 29 pages.

U.S. Appl. No. 12/986,435, filed Jan. 7, 2011, Final Office Action dated Mar. 22, 2013, 15 pages.

U.S. Appl. No. 12/986,577, filed Jan. 7, 2011, Non-final Office Action dated Jan. 17, 2013, 29 pages.

U.S. Appl. No. 13/022,373, filed Feb. 7, 2011, Non-final Office Action mailed Mar. 7, 2013, 79 pages.

U.S. Appl. No. 12/986,432, filed Jan. 7, 2011, Advisory Action dated Oct. 19, 2012, 2 pages.

U.S. Appl. No. 12/166,535, filed Jul. 2, 2008, Non-final Office Action mailed Nov. 21, 2012, 15 pages.

U.S. Appl. No. 13/022,377, filed Feb. 7, 2011, Non-final Office Action mailed Dec. 6, 2012, 37 pages.

U.S. Appl. No. 13/022,373, filed Feb. 7, 2011, Final Office Action mailed Oct. 7, 2013, 30 pages.

U.S. Appl. No. 12/986,577, filed Jan. 7, 2011, Non-Final Office Action dated Oct. 17, 2013, 24 pages.

U.S. Appl. No. 12/986,577, Final Office Action mailed on Mar. 13, 2014, 19 pages.

U.S. Appl. No. 12/986,435, Non-Final Office Action mailed on Apr. 23, 2014, 21 pages.

U.S. Appl. No. 12/986,432, filed Jan. 7, 2011, Restriction Requirement dated Mar. 23, 2012, 6 pages.

U.S. Appl. No. 13/022,377, filed Feb. 7, 2011, Final Office Action mailed Jun. 20, 2013, 23 pages.

U.S. Appl. No. 13/022,377, filed Feb. 7, 2011, Advisory Action mailed Aug. 30, 2013, 3 pages.

(56) References Cited

OTHER PUBLICATIONS

U.S. Appl. No. 13/022,377, filed Feb. 7, 2011, Non-Final Office Action mailed Jan. 10, 2014, 32 pages.
U.S. Appl. No. 13/022,373, filed Feb. 7, 2011, Advisory Action mailed Dec. 27, 2013, 3 pages.
U.S. Appl. No. 12/986,435, Final Office Action mailed on Aug. 6, 2014, 10 pages.
U.S. Appl. No. 13/022,377, Non-Final Office Action mailed on Sep. 9, 2014, 24 pages.
U.S. Appl. No. 12/986,432, Final Office Action mailed on Oct. 29, 2014, 20 pages.
U.S. Appl. No. 12/986,577, Non-Final Office Action mailed on Oct. 31, 2014, 18 pages.
U.S. Appl. No. 13/022,377, Final Office Action mailed on May 9, 2014, 27 pages.
U.S. Appl. No. 13/022,377, Advisory Action mailed on Jul. 16, 2014, 3 pages.
U.S. Appl. No. 12/986,432, Non-Final Office Action mailed on Jul. 7, 2014, 16 pages.
U.S. Appl. No. 12/986,432, Advisory Action mailed on Jan. 12, 2015, 2 pages.
U.S. Appl. No. 13/022,377, Final Office Action mailed on Jan. 5, 2015, 25 pages.
U.S. Appl. No. 12/986,435, Non-Final Office Action mailed on Dec. 4, 2014, 10 pages.
U.S. Appl. No. 12/986,435, Final Office Action mailed on Mar. 16, 2015, 11 pages.
U.S. Appl. No. 12/986,577, Final Office Action mailed on Mar. 23, 2015, 17 pages.
U.S. Appl. No. 12/166,535, filed Jul. 2, 2008, Final Office Action dated Feb. 1, 2012, 13 pages.
U.S. Appl. No. 12/986,577, Non-Final Office Action mailed on Jul. 10, 2015, 28 pages.
U.S. Appl. No. 13/022,377, Final Office Action mailed on Sep. 17, 2015, 32 pages.
U.S. Appl. No. 12/986,435, Non-Final Office Action mailed on Aug. 7, 2015, 17 pages.
U.S. Appl. No. 12/986,432, Non-Final Office Action mailed on Sep. 8, 2015, 60 pages.
U.S. Appl. No. 12/986,432, filed Jan. 7, 2011, Final Office Action dated Jan. 13, 2016, all pages.
U.S. Appl. No. 12/986,435, filed Jan. 7, 2011, Advisory Action dated Feb. 2, 2016, all pages.
U.S. Appl. No. 13/022,377, filed Feb. 7, 2011, Non-Final Office Action mailed Feb. 1, 2016, all pages.

\* cited by examiner

SYSTEM SELF INTEGRITY AND HEALTH VALIDATION FOR POLICY ENFORCEMENT

PRIORITY CLAIM

This application claims priority to U.S. Provisional Application No. 61/301,751, entitled SYSTEM SELF INTEGRITY AND HEALTH VALIDATION FOR POLICY ENFORCEMENT, filed on Feb. 5, 2010, which is incorporated by reference in its entirety for any and all purposes.

RELATED APPLICATION

This application is related to U.S. patent application Ser. No. 13/022,377, entitled, ON DEVICE POLICY ENFORCEMENT TO SECURE OPEN PLATFORM VIA NETWORK AND OPEN NETWORK, filed on Feb. 7, 2011, which is incorporated by reference in its entirety for any and all purposes.

BACKGROUND OF THE INVENTION

Embodiments of the present invention relate generally to methods and systems for enforcing system integrity and, more particularly, to using policy enforcement for ensuring self integrity and health validation of a system.

Presently, it is difficult (and often impossible) to impose particular policies on a user of a device. Some techniques for achieving this consist of essentially placing specific code (programs) that should appropriately restrict the device/user's behavior and/or report the device/user to a monitoring system. However, currently there is not a real way to ensure that programs that actively prevent or report certain actions are present and running properly, nor is there any way to ensure that no additional measures are present to circumvent such programs.

Some typical examples of such programs include ensuring that digital management rights (DRM) are respected (e.g., DVD/CD media copy protection, MPEG/OMA DRM for distributions, etc.). Further, programs include ensuring that archiving policies are respected (e.g., file retention timeouts, destruction policies, no not archive, etc.), ensuring software license management can execute, ensuring corporate "spyware" runs properly, adware agents, etc. Some additional examples include ensuring that a policy enforcer on a device is running, ensuring that appropriate security settings (e.g., firewall settings, antivirus software, etc.) are in place and running, ensuring documents are labeled properly (e.g., confidential) and that proper access to such documents is maintained (e.g., can be sent, copied, archived, downloaded, etc.). Furthermore, other examples of such software include ensuring that relevant events are properly logged, as well as ensuring that device/user clients such as those found in U.S. Pat. No. 7,426,381, entitled DEVICE BILLING AGENT, filed on Mar. 23, 2005, and U.S. Pat. No. 7,403,763, entitled DEVICE AGENT, filed on Sep. 19, 2005, which are incorporated by reference in their entirety for any and all purposes.

Some of the software that circumvents such programs result in a variety of problems. For example, DRM circumvention may include code that disables DRM protection, open source operating systems may skip or ignore DRM protections, or a chip (i.e., the Wiikeey chip) may prevent DRM protection systems. Regarding archiving policies, such policies may simply be ignored and unverified locally, or a copy can be done from other machines. With respect to software license management, such programs may be removed or prevent from running/starting or reporting may be prevented. Similarly, cooperative spyware, adware agents, policy enforcers, and security settings may also be removed, or prevented from running/starting or reporting. Accordingly, there are many ways to eliminate and circumvent programs running on a user device, and thus, there is a need for improvements in the art.

DETAILED DESCRIPTION OF THE INVENTION

Figure 1:
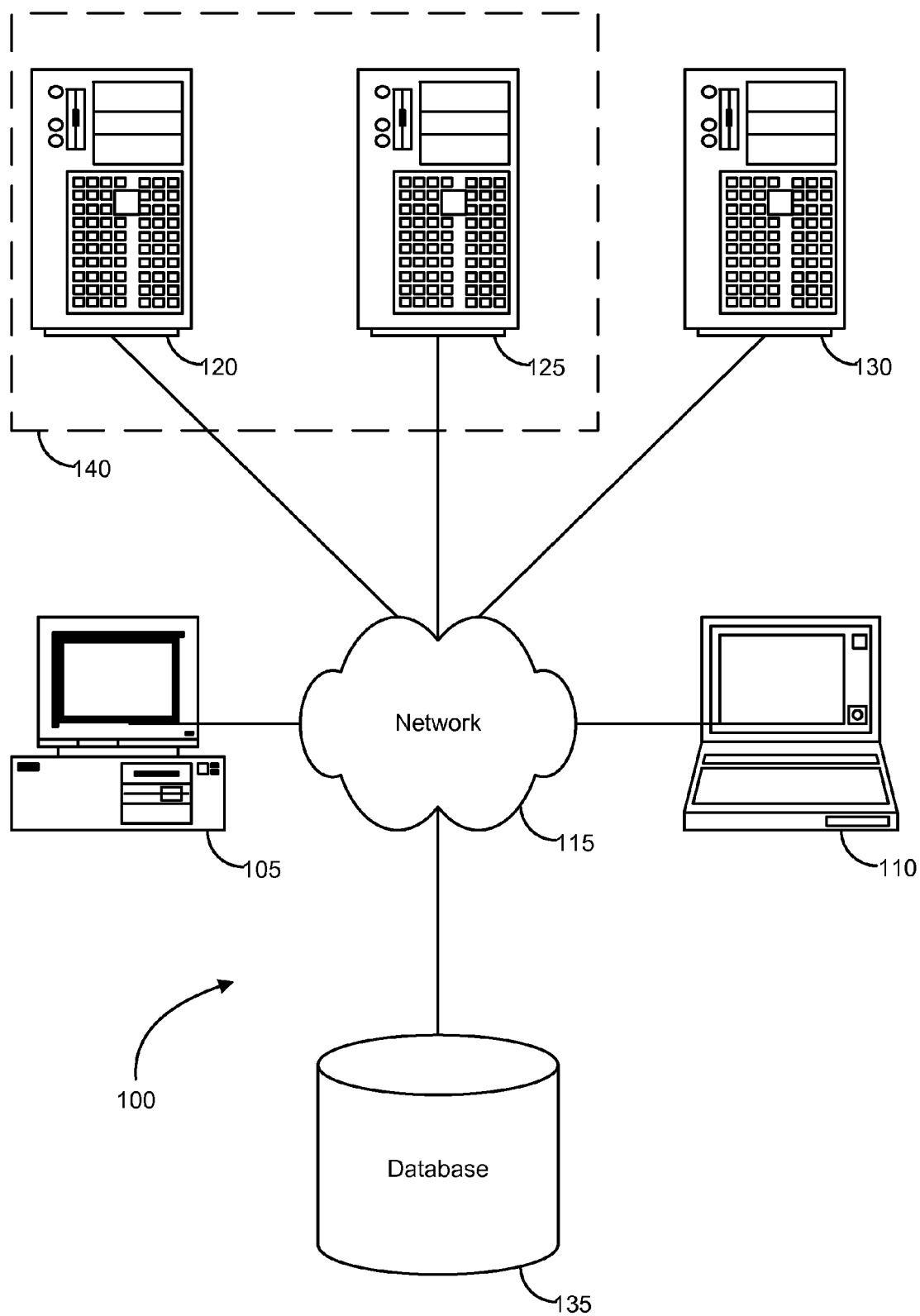
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Methods for enforcing policy-based advertisements are described. For example, a service request (e.g., a webpage request, a short message service (SMS) text request, a voice telephone call request, a video request, etc.) may be intercepted by a policy enforcement mechanism. This policy enforcement mechanism may intercept the service request and check if usage policies have been satisfied (e.g., authentication, authorization, subscription, etc.). The policy enforcement mechanism may further check if an advertisement should be presented to the user, and if so, what type of advertisement over what type of medium.

Accordingly, the policy enforcement mechanism may then dynamically present an advertisement(s) adapted to the medium channel and the user. Furthermore, the advertisement may allow the user to receive the desired service at a reduced fee or rate. Accordingly, once the advertisement has been accepted and/or received by the user, the service is then presented to the user. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, a dedicated application, a web browser, etc. The user computers 105, 110 can be general purpose personal computers (including, merely by way of example, personal computers and/or laptop computers running various versions of Microsoft® Corp.'s Windows® and/or Apple Corp.'s Macintosh® operating systems) and/or workstation computers running any of a variety of commercially available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network 115 can be any type of network familiar to those skilled in the art that can support data communications using any of a variety of commercially available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network ("WAN"); a virtual network, including without limitation, a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, etc.

The system 100 may also include one or more server computers 120, 125, 130 which can be general purpose computers and/or specialized server computers (including, merely by way of example, PC servers, UNIX servers, mid-range servers, mainframe computers rack-mounted servers, etc.), personal digital assistants (PDAs), and other such computing devices. One or more of the servers (e.g., 130) may be dedicated to running applications, such as a business application, a web server, an application server, etc. Such servers may be used to process requests from user computers 105, 110. The applications can also include any number of applications for controlling access to resources of the servers 120, 125, 130.

The web server 140 can be running an operating system including any of those discussed above, as well as any commercially available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation, those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from user computers 105, 110 and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 120, 125, 130. Alternatively, it may be remote from any or all of the computers 105, 110, 120, 125, 130, and/or in communication (e.g., via the network 115) with one or more of these. In a particular set of embodiments, the database 135 may reside in a storage-area network ("SAN") familiar to those skilled in the art. Similarly, any necessary files for performing the functions attributed to the computers 105, 110, 120, 125, 130 may be stored locally on the respective computer and/or remotely, as appropriate. In one set of embodiments, the database 135 may be a relational database, such as Oracle® 10 g, that is adapted to store, update, and retrieve data in response to SQL-formatted commands.

Figure 2:
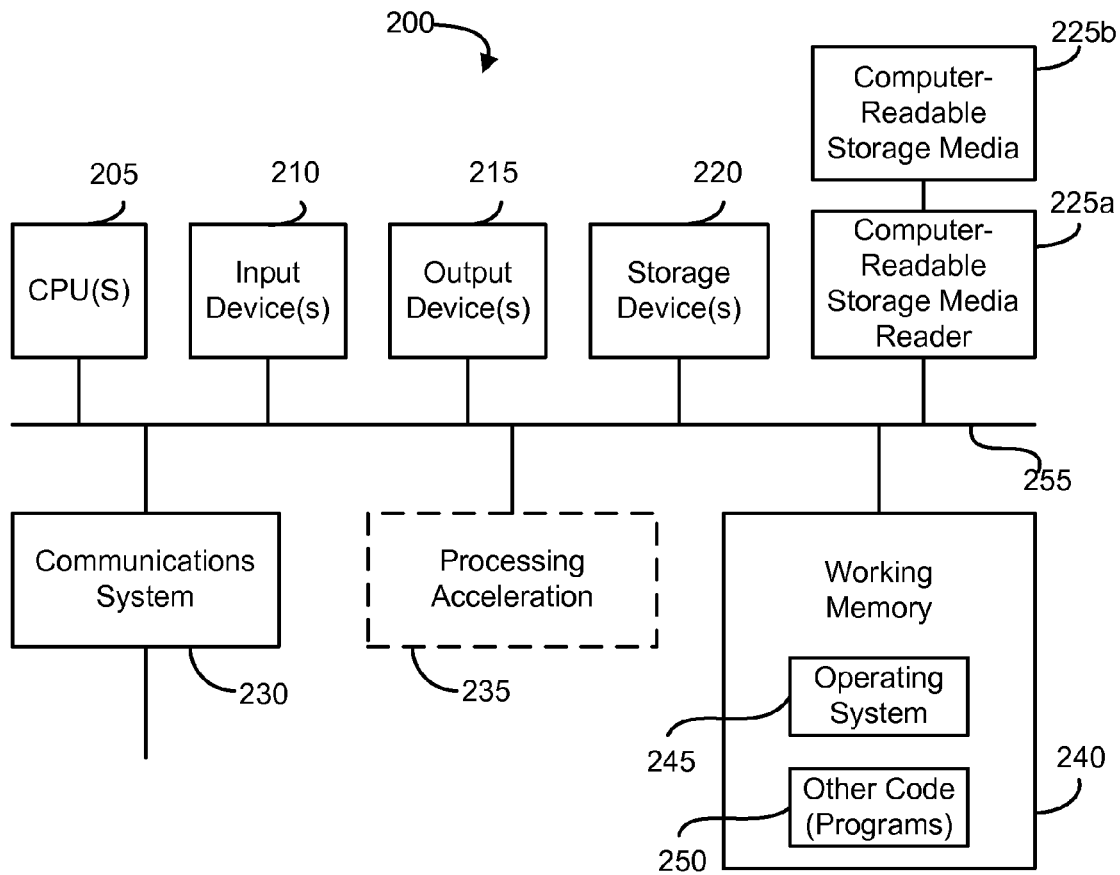
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage devices 220. By way of example, storage devices 220 may be disk drives, optical storage devices, and/or solid-state storage devices such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 115 (FIG. 1) and/or any other computer described above with respect to the system 200.

The computer system 200 may also be comprised of software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
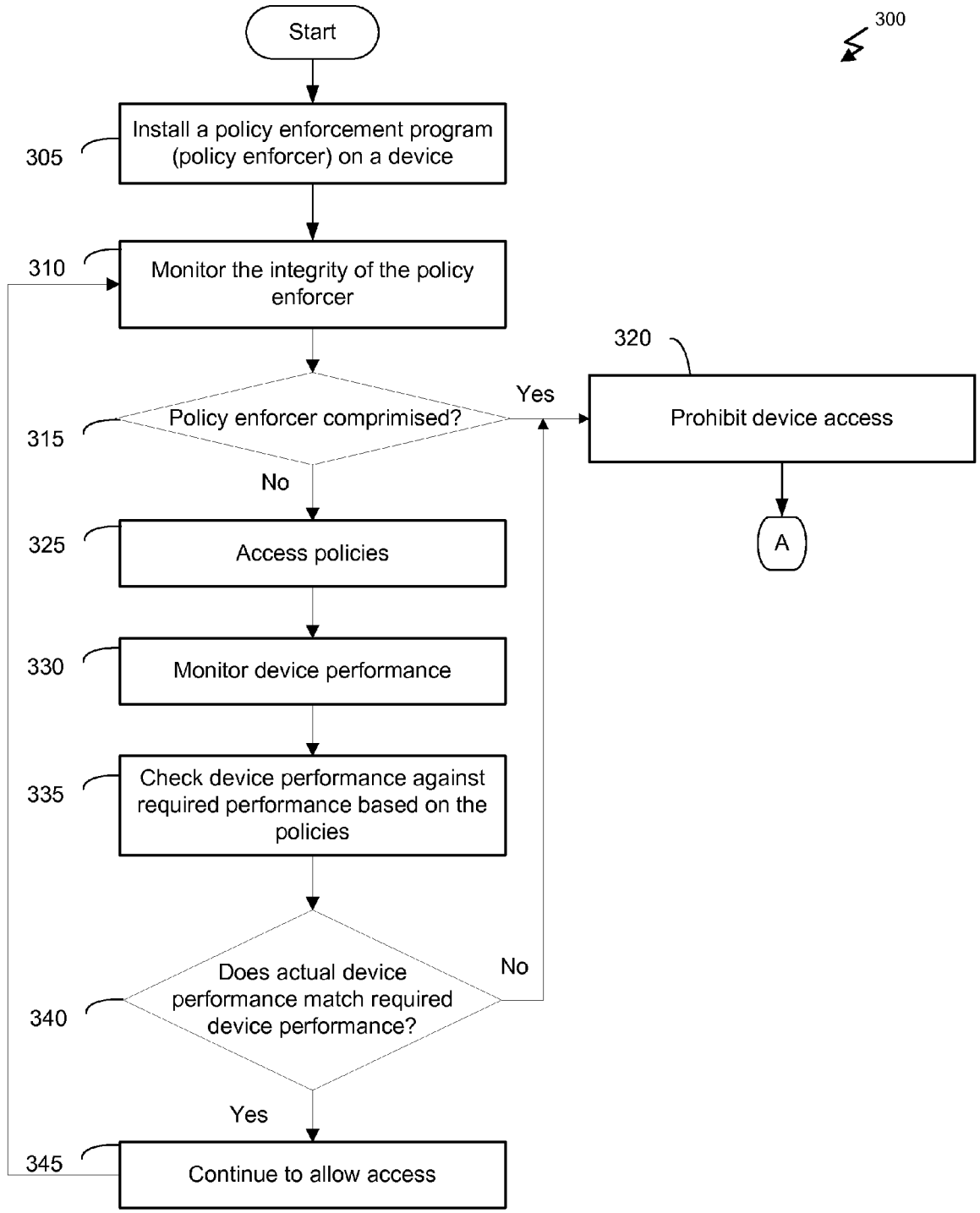
FIG. 3 is a flow diagram illustrating a method for using policy enforcement for ensuring self integrity and health validation of a system, according to one embodiment of the present invention.

Turning next to FIG. 3, a method 300 is illustrated for using policy enforcement for ensuring self integrity and health validation of a system, according to one embodiment of the present invention. At process block 305, a policy enforcement program (i.e., policy enforcer) may be installed on a device. In one embodiment, the device may be a mobile device, a cellular device, a personal digital assistant (PDA), a personal computer, or the like. Alternatively, the policy enforcer may be installed on a computer system external to the device.

Furthermore, the integrity of the policy enforcer may be monitored (process block 310). In other words, the policy enforcer may "self" monitor its health and integrity in order to determine whether the policy enforcer has been compromised (decision block 315). For example, the policy enforcer may examine itself to determine whether its coding, associated policy files and other files have been modified, etc. If at any time the policy enforcer determines that it has been compromised, the policy enforcer can instruct the device's service provider to prohibit access to the device (process block 320). In one embodiment, the service provider may be a cellular service provider, an Internet service provider (ISP), a digital media provider, etc. Further, the policy enforcer may check its integrity at set intervals (e.g., every 10 seconds, every hour, every day, etc.), or the policy enforcer may check itself at random intervals.

If it is determined that the policy enforcer has not been compromised, then at process block 325, a policy database is accessed and policies are retrieved. In one embodiment, such policies instruct the policy enforcer as to the appropriate action to take with regard to certain situations. As discussed above a number of programs may be used to circumvent software applications running on the device. For example, DRM protection, DVD/CD copy protection, MPEG/OMA DRM for distributions, archiving policies, software license management, "corporate spyware", adware agents, security settings (firewall, antivirus, etc.), document labeling logging of relevant events, device agents, among other things may utilize policies and the policy enforcer to ensure proper execution.

As such, at process block 330, the policy enforcer will monitor the performance of the device, and check the device performance against any performance requirements set forth by the polices (process block 335). For example, a policy regarding DRM enforcement may direct the policy enforcer to check for any software programs configured to circumvent DRM protection. Alternatively, a policy regarding corporate spyware may be configured to direct the policy enforcer to monitor whether the device is properly logging and reporting events and actions according to the specifications of the corporate spyware. As such, the policy enforcer is able to ensure the integrity of a variety of programs running in the device.

Accordingly, at decision block 340, a determination is made whether the actual device performance matches the required device performance. If the actual performance and the required performance match, then at process block 345, the device is continued to be allowed access to services provided by the service provider. However, if it is determined that the actual performance does not match the required performance, then at process block 320, the device is denied service from the service provider, at least until the breach can be remedied.

According to a further embodiment, results from the policy enforcer's analysis of the device performance may be reported to the service provider. In one embodiment, the report may be transmitted to the service provider at the time it is discovered (in real time), or in a batch. Furthermore, as opposed to issuing a complete denial of service, the policy enforcer may only deny service related to the breached software and/or device resources.

Turning now to an alternative embodiment, which provides for application and application modules to include an electronic signature in any messages sent to each other (always or sometimes) and to a server (or service provider). The signed messages are configured to ensure the presence of the enforcement modules. In one embodiment, multiple key modules may be applied on a data exchange and each application or application module can sign each of their contributions and the sequences of keys may then be used as proof of correct processing.

Furthermore, modules may have their own condition to check. Such a condition check may include a platform/presence of other known malicious programs, the absence of encryption/protection removal (e.g., by testing themselves to determine if virtually protected data is read protected or is unprotected), or the condition check may prompt the user to take some actions like placing a dedicated CD or file in a certain place as a condition of usage of the device or media on the device.

In addition, testing of chip/circuit/diagnostic to determine if additional chips are present on the device (e.g., if the correct disc is detected before the disc is introduced, if a hardware addition's signature is detected, etc.). If such hardware is detected, then the device may be denied service, or the like.

A such, systems like DRM protection, adware, corporate spyware, etc. may be correctly/easily/practically implemented. Furthermore, tampering with software can be detectable and reported, resulting in denial of service as appropriate; removing or preventing the rogue program running can be detected and reported, also resulting in denial of service, as appropriate. Additionally, aspects of the present invention add extra layers to confuse the rogue software and that can be detected and reported, further resulting in denial of service. The addition of software that is incompatible with software running on the device can be detected and reported, which may result in a denial of service, as appropriate. Furthermore, aspects of the present invention can detect and determine the use of an alternative O/S in order to circumvent certain protection, report the use of such an O/S and deny service.

Figure 4:
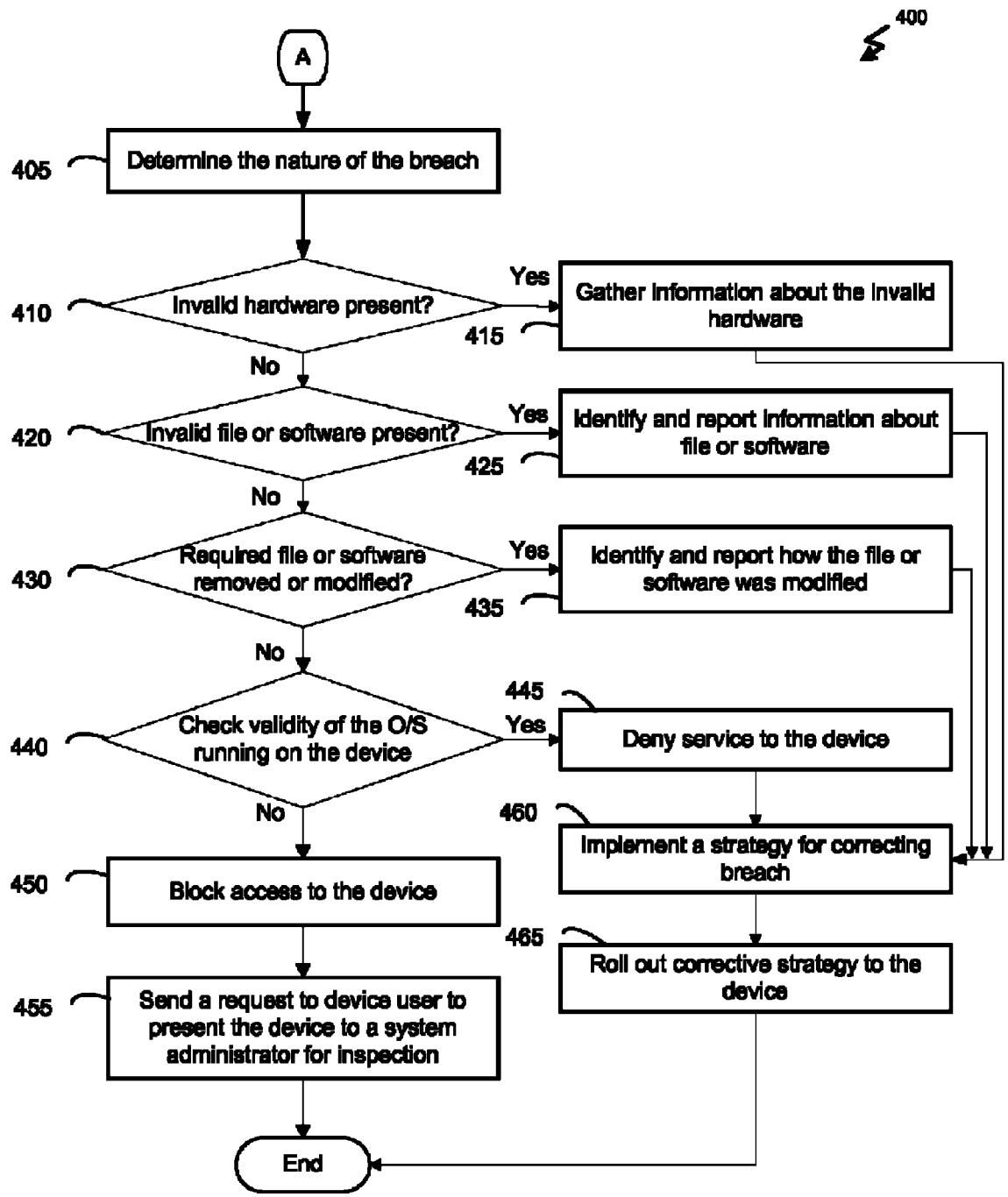
FIG. 4 is a flow diagram further illustrating a method for using policy enforcement for ensuring self integrity and health validation of a system, according to one embodiment of the present invention.

Turning now to FIG. 4, which illustrates a method 400 of mitigating the effects of rouge software and/or file, according to a further embodiment of the present invention. Continuing form point A in FIG. 3, at process block 405, the nature of the breach or rogue software, file, O/S, firmware, drivers, hardware/peripheral, etc. are determined. Particularly, a determination is made whether invalid additional and/or modified hardware is present on the device (decision block 410). If modified or invalid additional hardware is found on the device, then information about the hardware may be gathered and reported (process block 415). Otherwise, a determination is made whether an invalid file or software application (or O/S, firmware, drivers, hardware/peripheral, etc.) is present on the device (decision block 420).

If an invalid file or software application, file, O/S, firmware, drivers, hardware/peripheral, etc. is found on the device, then at process block 425, the file or software application is identified and information about the file or software application is reported. Alternatively, if there are no invalid files or software applications found on the device, then a determination is made whether required files or software have been removed or modified on the device (decision block 430). If it is determined that required files or software have been removed of modified, then at process block 435, the removed/modified software/file is identified and reported. Specifically, if the file of software was modified, then exactly how the software or file was modified may also be reported.

If no required software or files have been modified, then, at decision block 440, a check of the validity of the O/S running on the device is performed. Certain O/S systems may be used to circumvent certain protections, and as such, if the device is running such an O/S, the device may be compromised. For example, the Linux O/S may be used to circumvent DRM protect. Accordingly, if an invalid O/S is being used by the device, at process block 445, service may be denied the device.

If the O/S is valid, then at process block 450, access to service for the device is blocked. Then, at process block 455, a request may be sent to the device user instructing the user to present the device to a system administrator for inspection and/or repair.

Furthermore, continuing to process block 460, based on the information gathered about the various intrusions into the device, a strategy to repair the device may be implemented. At process block 465, the corrective strategy may then be rolled out to the device. Such a roll-out may be in the form of a patch, a policy update, a reinstall, a peripheral update, program setting, etc.

Figure 5:
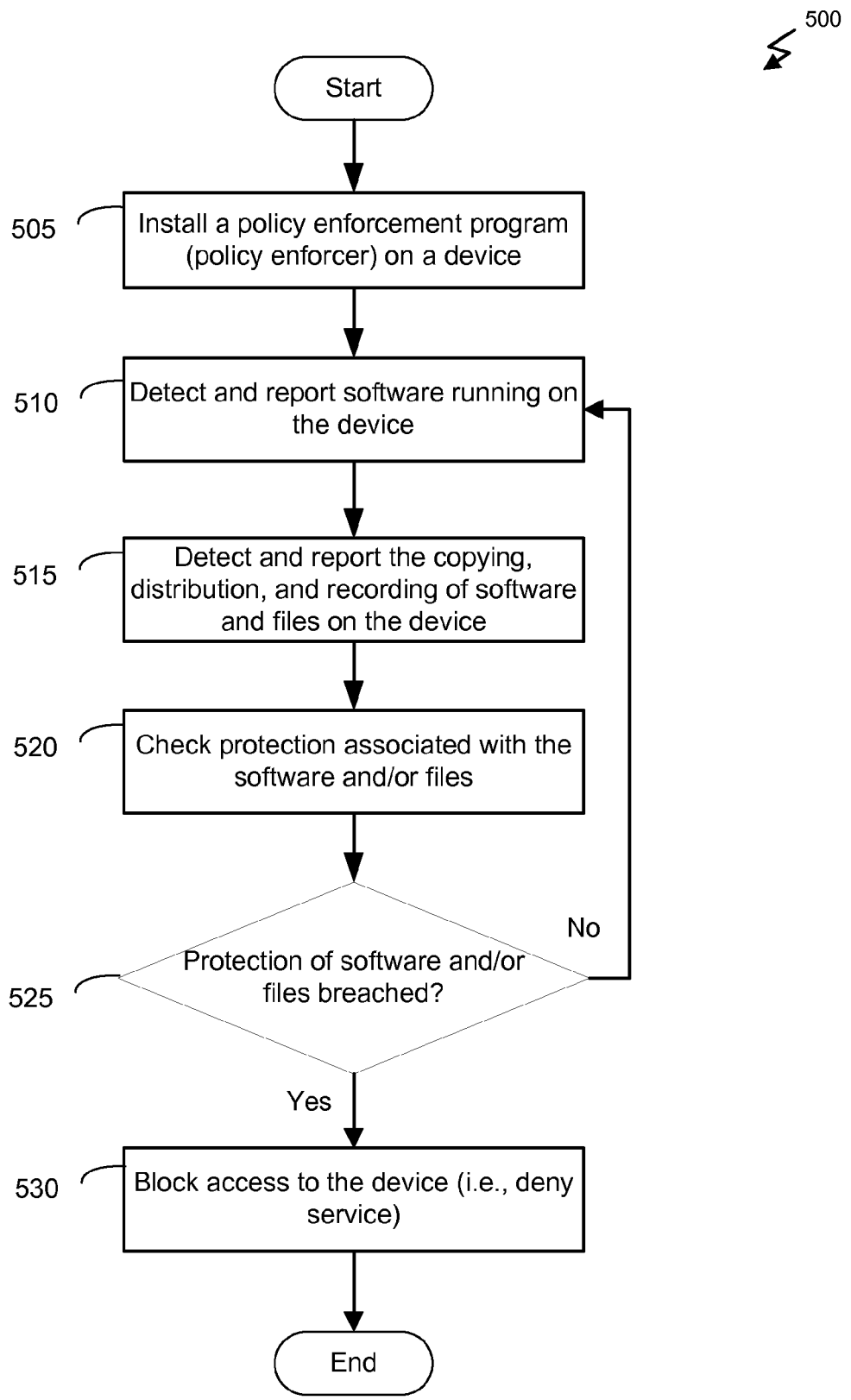
FIG. 5 is a flow diagram illustrating a method for using policy enforcement for ensuring self integrity and health validation of a system, according to an alternative embodiment of the present invention.

Referring next to FIG. 5, a method 500 is illustrated for using policy enforcement for ensuring self integrity and health validation of a system, according to an alternative embodiment of the present invention. At process block 505, a policy enforcer program (or chip) is installed on a device. At process block 510, the policy enforcer detects and reports the software running on the device.

Furthermore, at process block 515, the policy enforcer detects and reports any copying, distributing, and/or recording of software and/or files on the device. For example, if a document is copied and distributed to a number of other devices, or a copy of a music file is made, etc., the policy enforcer detects and reports such activity performed by the device.

Then, the policy enforcer checks protection (if any) associated with the copied, distributed, or recorded filed and/or software (process block 520). For example, a video file may be restricted from being copied or distributed, or both, or alternatively, a text file may have a copying restriction, etc. As such, at decision block 525, a determination is made whether the protections have been breached by the actions of the device. If no breach is detected, then the policy enforcer continues to detect and report the activities of the device (process block 510). Conversely, if the protections have been breached, then at process blocked 530, access to the device is block and service is denied until corrective action can be taken.

Figure 6A:
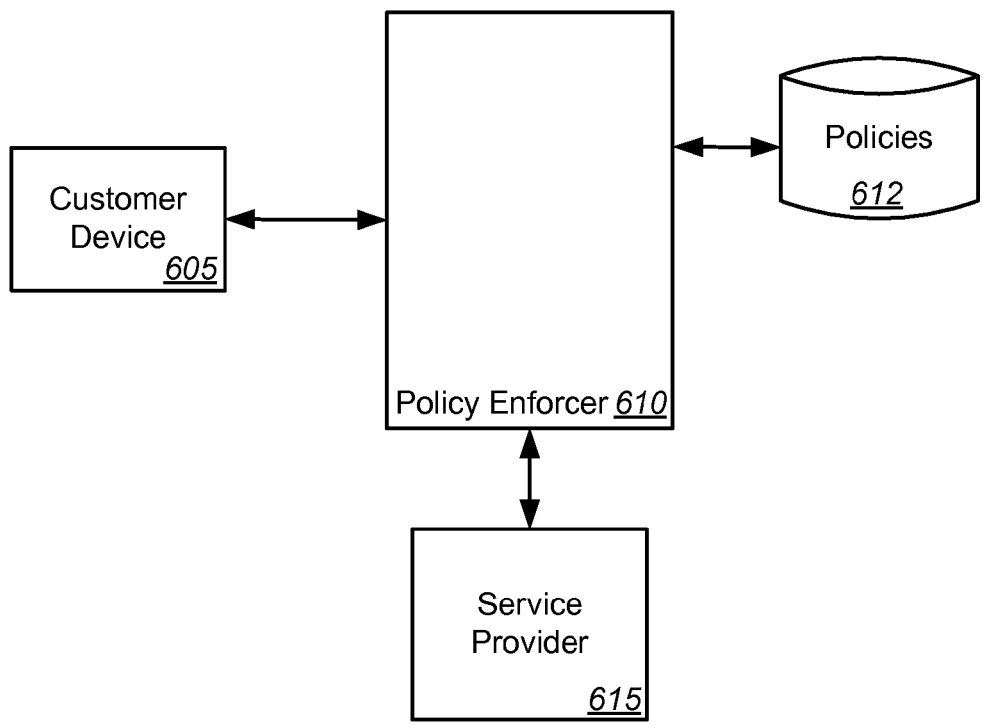
FIGS. 6A and 6B are block diagrams illustrating systems for using policy enforcement for ensuring self integrity and health validation of a system, according to embodiments of the present invention.

Turning to FIG. 6A, a system is shown for using policy enforcement for ensuring self integrity and health validation of a system, according to one embodiment of the present invention. The system includes a customer device 605 in connection with a policy enforcer 610. Further, policy enforcer 610 is coupled with a policy database 612 and a service provider 615. In one embodiment, the system in FIG. 6A may be used to implement methods 300, 400, and 500 described above.

For example, customer device 605 may install an invalid O/S, a DRM circumventing software, an invalid hardware chip, etc., and policy enforcer 610 may detect such actions by customer device 605, and based on the policies stored in policy database 612, policy enforcer 610 may then report such activities by customer device 605 to service provider 615. Accordingly, policy enforcer 610 may then deny service to customer device 605 based on the activities of customer device 605.

Figure 6B:
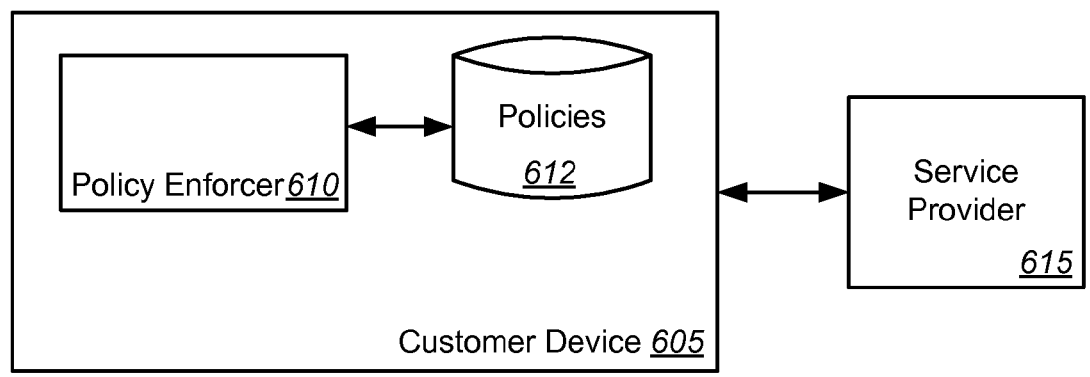

FIG. 6B illustrates a system for using policy enforcement for ensuring self integrity and health validation of a system, according to an alternative embodiment of the present invention. Similar to the system in FIG. 6A, the system in FIG. 6B may be used to implement methods 300, 400, and 500. However, instead of policy enforcer 610 and policy database 612 being located remotely from customer device 605, policy enforcer 610 and policy database 612 are locally located on customer device 605.

In the foregoing description, for the purposes of illustration, methods were described in a particular order. It should be appreciated that, in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits, programmed with the instructions to perform the methods. These machine-executable instructions may be stored on one or more machine-readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of enforcing system self-integrity validation policies, the method comprising:
    installing a policy enforcer on a client device;
    using the policy enforcer to examine the policy enforcer itself to determine whether the policy enforcer itself has been compromised;
    in response to a determination that the policy enforcer has been compromised, prohibiting access of the client device to the services provided by the service provider;
    installing, on the client device, a plurality of policies configured to enforce system integrity of the client device;
    monitoring, using the policy enforcer, system performance of the client device to determine actual system performance of the client device;
    based on a first policy in the plurality of policies, comparing the actual system performance of the client device with system performance required by the first policy, wherein the first policy restricts the use of operating systems (O/S) that circumvent digital rights management (DRM) protections;
    determining, by the policy enforcer, that the actual system performance of the client device does not match the system performance required by the first policy;
    identifying one or more software processes responsible for the actual system performance of the client device not matching the system performance required by the first policy including identifying that an O/S running on the client device is circumventing the DRM protections;
    identifying first services from the service provider that are related to the one or more software processes including identifying services that provide DRM-protected files; and
    denying the client device access to the first services from the service provider while continuing to allow the client device access to other services from the service provider, wherein the client device is denied access to the DRM-protected files provided by the identified services.

2. The method of claim 1, further comprising:
    based on the comparison, determining that the client device has performed consistently with a second policy in the plurality of policies; and
    in response, continuing to allow the system to access services provided by the service provider that are associated with the second policy.

3. The method of claim 1, further comprising:
    determining that the policy enforcer has not been compromised; and
    continuing to allow the client device to access services provided by the service provider.

4. The method of claim 1, wherein the policy enforcer is compromised based in part on one or more of the following situations: hardware associated with the policy enforcer has been modified, software of the policy enforcer has been modified and/or deleted, files associated with the policy enforcer have been modified and/or deleted, software and/or hardware has been added to the system to circumvent operation of the policy enforcer, programs, services, O/S, firmware, drivers, or the peripherals.

5. The method of claim 1, further comprising:
    in response to determining that the actual system performance of the client device does not match the system performance required by the first policy, implementing a mitigation process for repairing the one or more software processes.

6. The method of claim 5, wherein the mitigation process comprises:
    determining if invalid hardware is present within the client device;
    in response to invalid hardware being present, gathering information about the hardware;
    implementing a corrective strategy; and
    propagating the corrective strategy to the client device.

7. The method of claim 5, wherein the mitigation process further comprises:
    determining if invalid files and/or software are present within the client device; and
    in response to invalid files and/or software being present, identifying and reporting information about the invalid files and/or software.

8. The method of claim 5, wherein the mitigation process further comprises:

determining if required files and/or software has been removed or modified within the client device; and in response to required files and/or software being removed or modified, identifying and reporting which required files and/or software have been removed and/or how the required files and/or software have been modified.

9. The method of claim 5, wherein the mitigation process comprises:

checking the validity of the operating system (O/S) present on the client device; and in response to the O/S being invalid, denying service to the client device.

10. A non-transitory computer-readable medium comprising instruction which, when executed by one or more processors, cause the one or more processors to perform operations comprising:

installing a policy enforcer on a client device;

using the policy enforcer to examine the policy enforcer itself to determine whether the policy enforcer itself has been compromised;

in response to a determination that the policy enforcer has been compromised, prohibiting access of the client device to the services provided by the service provider;

installing, on the client device, a plurality of policies configured to enforce system integrity of the client device;

monitoring, using the policy enforcer, system performance of the client device to determine actual system performance of the client device;

based on a first policy in the plurality of policies, comparing the actual system performance of the client device with system performance required by the first policy, wherein the first policy restricts the use of operating systems (O/S) that circumvent digital rights management (DRM) protections;

determining, by the policy enforcer, that the actual system performance of the client device does not match the system performance required by the first policy;

identifying one or more software processes responsible for the actual system performance of the client device not matching the system performance required by the first policy including identifying that an O/S running on the client device is circumventing the DRM protections;

identifying first services from the service provider that are related to the one or more software processes including identifying services that provide DRM-protected files; and denying the client device access to the first services from the service provider while continuing to allow the client device access to other services from the service provider, wherein the client device is denied access to the DRM-protected files provided by the identified services.

11. The medium of claim 10, wherein the instructions cause the one or more processors to perform further operations comprising:

determining that the first policy has not been breached; and continuing to detect and report software running on the client device and the copying, distributing, and modifying of the software and/or files on the client device.

12. The medium of claim 10, wherein the client device comprises one or more of the following: a wireless device, a personal digital assistant (PDA), a personal computer, and a mobile device.

13. The medium of claim 10, wherein the service provider comprises one or more of the following: a cellular service provider, an Internet service provider (ISP), a digital media service provider, and a software service provider.

14. The medium of claim 10, wherein the first policy comprises requirements related to one or more of the following: digital media rights (DRM) enforcement, software license enforcement, corporate spyware enforcement, security setting enforcement, and file rights enforcement.

15. The method of claim 1, wherein the policy enforcer is configured to check its own integrity at random intervals.

16. The method of claim 1, further comprising receiving a reinstallation of the one or more software processes from the service provider.

17. The method of claim 1, wherein:

the first policy specifies testing of circuits on the client device; and determining that the actual system performance of the client device does not match the system performance required by the first policy comprises determining that additional hardware chips are present on the client device.

18. The method of claim 1, wherein:

the policy enforcer comprises a plurality of key modules;

the client device runs a plurality of applications that send messages to each other and to the service provider;

the plurality of key modules electronically sign the messages sent between applications and to the service provider; and the policy enforcer is further configured to use a sequence of keys used in the signatures to determine whether the messages were correctly processed.

* * * * *

UNITED STATES PATENT AND TRADEMARK OFFICE
CERTIFICATE OF CORRECTION

PATENT NO. : 9,495,521 B2  Page 1 of 1
APPLICATION NO. : 13/022367
DATED : November 15, 2016
INVENTOR(S) : Maes It is certified that error appears in the above-identified patent and that said Letters Patent is hereby corrected as shown below:

In the Drawings

On sheet 3 of 6, in FIG. 3, under Reference Numeral 315, Line 1, delete "comprimised?" and insert -- compromised? --, therefor.

In the Specification

In Column 1, Line 63, delete "Wiikeey" and insert -- Wiikey --, therefor.

In Column 7, Line 59, delete "form" and insert -- from --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*